(12) United States Patent
Bill (10) Patent No.: US 11,951,781 B2
(45) Date of Patent: Apr. 9, 2024

(54) INDICATING ERRORS IN A TIRE MONITORING SYSTEM

(71) Applicant: AIRBUS OPERATIONS LIMITED, Bristol (GB)

(72) Inventor: Andrew Bill, Bristol (GB)

(73) Assignee: Airbus Operations Limited, Bristol (GB)

( * ) Notice: Subject to any disclaimer, the term of this patent is extended or adjusted under 35 U.S.C. 154(b) by 149 days.

(21) Appl. No.: 17/419,614

(22) PCT Filed: Jun. 16, 2020

(86) PCT No.: PCT/EP2020/066543
§ 371 (c)(1),
(2) Date: Jun. 29, 2021

(87) PCT Pub. No.: WO2020/254275
PCT Pub. Date: Dec. 24, 2020

(65) Prior Publication Data
US 2022/0105758 A1    Apr. 7, 2022

(30) Foreign Application Priority Data
Jun. 17, 2019 (GB) ...................... 1908630

(51) Int. Cl.
*B60C 23/04* (2006.01)
(52) U.S. Cl.
CPC ...... *B60C 23/0479* (2013.01); *B60C 23/0481* (2013.01); *B60C 2200/02* (2013.01)

(58) Field of Classification Search
CPC .. B60C 23/0479; B60C 23/0481; B60C 23/04
See application file for complete search history.

(56) References Cited

U.S. PATENT DOCUMENTS

| 6,580,364 | B1  |   | 6/2003 | Munch et al. |
| 7,336,163 | B2  | * | 2/2008 | Fujii ............... B60C 23/0442 340/447 |

(Continued)

FOREIGN PATENT DOCUMENTS

| CN | 105899378 A | 8/2016 |
| CN | 107808430   | 3/2018 |

(Continued)

OTHER PUBLICATIONS

Combined Search and Examination Report for GB Application No. 1908630.5 dated Oct. 22, 2019, 8 pages.

(Continued)

*Primary Examiner* — John A Tweel, Jr.
(74) *Attorney, Agent, or Firm* — Nixon & Vanderhye P.C.

(57) ABSTRACT

A tire monitoring device and method in which an error can be detected and indicated. The tire monitoring device includes an indicator and a wireless communication interface. The method of operating the tire monitoring device includes: receiving an instruction to measure a tire pressure via the wireless communication interface; measuring a tire pressure; determining an error status of the tire pressure monitoring device; and responsive to a determination that the error status is not indicative of an error, activating the indicator to provide an indication based on the tire pressure.

10 Claims, 7 Drawing Sheets

(56) References Cited

U.S. PATENT DOCUMENTS

| | | | |
|---|---|---|---|
| 10,434,827 | B2 | 10/2019 | Tomakidi |
| 11,161,514 | B2 * | 11/2021 | Velazquez Alcantar ..................... B60L 15/2009 |
| 11,654,729 | B2 * | 5/2023 | Bill .......................... B60C 23/20 340/447 |
| 2010/0083747 | A1 | 4/2010 | Fink et al. |
| 2011/0043354 | A1 * | 2/2011 | Shepler ................ B60C 23/008 340/447 |
| 2019/0184772 | A1 | 6/2019 | Bill et al. |
| 2022/0055423 | A1 * | 2/2022 | Bill .................... B60C 23/0479 |

FOREIGN PATENT DOCUMENTS

| | | |
|---|---|---|
| DE | 10 2018 005 791 | 1/2019 |
| EP | 1 388 439 | 2/2004 |
| EP | 1 878 595 | 1/2008 |
| EP | 2 692 550 | 2/2014 |
| EP | 2 910 393 | 4/2017 |
| JP | 11-78445 | 3/1999 |
| KR | 10-0682528 | 2/2007 |
| KR | 10-2018-0069332 | 6/2018 |
| WO | 2006/0089631 A1 | 8/2006 |

OTHER PUBLICATIONS

International Search Report and Written Opinion of the ISA for PCT/EP2020/066543 dated Sep. 28, 2020, 11 pages.
Chinese Office Action cited in Application No. 202080007641.3, mailed Dec. 8, 2023, 7 pages.

\* cited by examiner

INDICATING ERRORS IN A TIRE MONITORING SYSTEM

RELATED APPLICATION

This application is the U.S. national phase of International Application PCT/EP2020/066543 filed Jun. 16, 2020, which designated the U.S. and claims priority to United Kingdom patent application GB 1908630.5 filed Jun. 17, 2019, the entire contents of each of which are hereby incorporated by reference.

TECHNICAL FIELD

The present disclosure relates to a tyre monitoring system and methods of its operation. In examples, the present disclosure relates to an aircraft tyre monitoring system, such as an aircraft tyre pressure monitoring system.

BACKGROUND

Checking tyre pressure is an important part of the maintenance of a vehicle. Tyre pressures should be maintained at predetermined pressures to ensure that a tyre performs as intended by the manufacturer. Incorrect tyre pressure can lead to a tyre failing, perhaps bursting and causing damage to the vehicle and/or a loss of control. Due to the high speeds encountered by the tyres on aircraft landing gear, pressures are checked regularly, perhaps once a day or more frequently. Manual checking of tyre pressure takes time, reducing this time is beneficial.

It has been proposed to automate tyre pressure measurement by included a sensing device in a wheel which can then be interrogated wirelessly to provide a measurement of tyre pressure. This can reduce the time required compared to a manual reading but can still take time due to a requirement to travel from wheel to wheel measuring the pressures.

It would be desirable to provide a tyre pressure measurement system which addresses some, or all, of these points.

SUMMARY

According to a first example, a method of operating a tyre monitoring device associated with a vehicle is provided. The tyre monitoring device comprising an indicator and a wireless communication interface. The method comprises: receiving an instruction to measure a tyre pressure via the wireless communication interface; measuring a tyre pressure; determining an error status of the tyre pressure monitoring device; and responsive to a determination that the error status is not indicative of an error, activating the indicator to provide an indication based on the tyre pressure.

Optionally, the method may further comprise: responsive to a determination that the error status is indicative of an error, not activating the indicator.

Optionally, the method may further comprise, responsive to the determination that the error status is not indicative of an error, transmitting data representative of a device status to other tyre monitoring devices associated with the vehicle.

Optionally, the method further comprises: receiving data representing tyre pressure measurements from other tyre monitoring devices associated with the vehicle; and wherein the activating the indicator is in dependence on both a determination that the error status does not indicate an error and a determination that data representative of device status has been received from all the other tyre pressure monitoring devices associated with the vehicle.

Optionally, the indication provided by the indicator is based on both the measured tyre pressure and the data representative of device status received from other tyre monitoring devices associated with the vehicle.

Optionally, the method further comprises, responsive to the determination that the error status is not indicative of an error, transmitting data representative of a device status to a control device.

Optionally, the method further comprises, responsive to the activating the indicator, transmitting data representative of a device status to a control device.

According to another example, there is provided a tyre monitoring device comprising: a wireless communication interface; an indicator; a pressure sensor; and a processor. The processor is configured to execute the method according to any one of the preceding claims.

According to a further example, there is provided a method for a control device for a tyre monitoring system, the control device comprising a wireless communication interface. The method comprises: transmitting an instruction to measure a tyre pressure to a plurality of tyre monitoring devices each associated with a same vehicle using the wireless communication interface; initiating a timer when the instruction is transmitted; determining that the timer has reached a predetermined value without receiving a response to the instruction to measure a tyre pressure from all of the plurality of tyre monitoring devices; and responsive to the determination causing the control device to indicate an error with the tyre monitoring system.

Optionally the causing the control device to indicate an error with the tyre monitoring system comprises providing an indication of the status of the tyre monitoring devices based on the responses received before the timer reached the predetermined value.

Optionally, the providing an indication includes an indication of those devices from which a response was not received.

According to another example, there is provided a control device comprising: a wireless communication interface; a display; and a processor. The processor is configured to carry out the method described above.

According to still another example, there is provided a system comprising a control device as described above and a plurality of tyre monitoring devices as described above.

According to a further example, there is provided a system comprising: a control device comprising a wireless communication interface; and a plurality of tyre monitoring devices configured to be affixed to a wheel. Each of the tyre monitoring devices comprise a wireless communication interface and an indicator. The plurality of tyre monitoring devices are configured to receive a measurement command from the control device via the wireless communication interface and to indicate that they have an error by not activating the indicator and by not transmitting a response to the measurement command.

Further features and advantages of the invention will become apparent from the following description of preferred examples of the invention, given by way of example only, which is made with reference to the accompanying drawings.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain methods and systems described herein relate to the operation of a sensor network in an aircraft, such as a network of tyre monitoring devices. In examples described herein, references to "aircraft" include all kinds of aircraft, such as fixed wing, for example military or commercial aircraft, or unmanned aerial vehicles (UAVs), and rotary wing aircraft, for example helicopters.

According to examples herein, tyre monitoring devices are able to determine whether they have an error and, when an error is detected, this is indicated to other devices in a tyre monitoring system by providing no response to received commands, such as measurement commands or instructions. In this way, the absence of a response from a device can be interpreted as indicative of an error in the device. The system will fail safe because the same behaviour would be adopted by the tyre monitoring device if it was completely inoperative.

In a system comprising a plurality of tyre monitoring devices which share data of their status, such as an inflation status of their associated tyre, sending no response to the other tyre monitoring devices allows those other devices to establish that an error has occurred because no response is received and take appropriate action. For example, when any tyre monitoring device has an error, all of the other tyre monitoring devices in the system can also indicate an error, such as by providing no indication to a user. In this way the error status is clear and the system cannot be misinterpreted as functioning correctly.

A control device may be able to deduce which of the tyre monitoring devices has an error by determining which tyre monitoring device(s) have not provided a response and provide an indication of this. This allows the erroneous tyre monitoring devices to be identified using the control device.

Example Tyre Monitoring System

Figure 1:
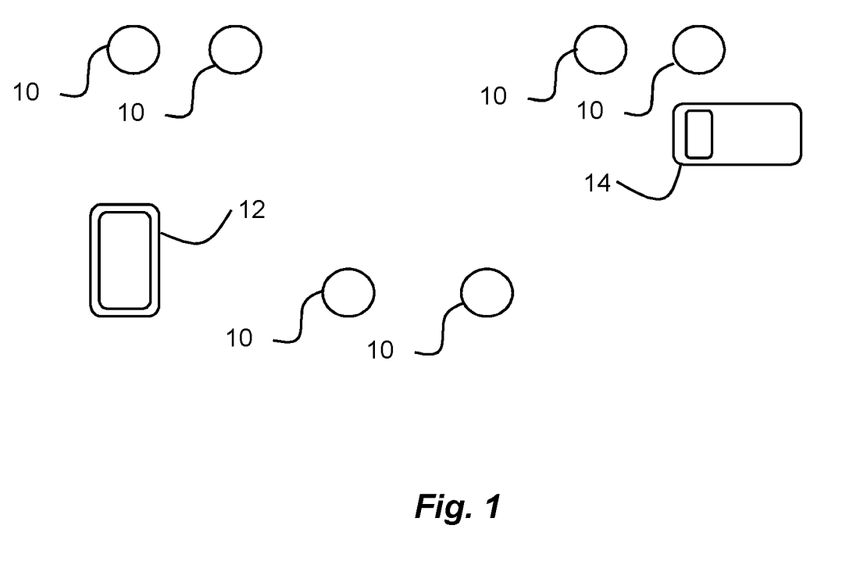
FIG. 1 shows a schematic representation of a tyre monitoring system according to a first example of the invention.

FIG. 1 shows a schematic representation of a tyre monitoring system, in this case a pressure sensor system according to a first example. The system comprises a plurality of tyre monitoring devices 10, a control device 12 and a configuration device 14, all of which are arranged to communicate via wireless communication. A tyre monitoring device is mounted on each wheel of a vehicle, in this case an aircraft (as explained in more detail below, with reference to FIG. 5). The control device 12 is separate from the tyre pressure sensors 10 and may be a dedicated control device which functions only in the tyre pressure sensor system, or a computing device which can also be used for other purposes than with the tyre pressure sensor system. Example computing devices include mobile devices such as laptops, tablets, cellular phones and wireless communication devices.

The wireless communications in the tyre pressure sensor system of FIG. 1 may use a local area network or a personal area network and can have any suitable topography, including centralized and mesh wireless systems. In centralized systems, a single device may be nominated as a master device to coordinate communications, or one or more additional wireless access points, gateways or controllers (not shown) may be used. In some examples, the tyre monitoring devices 10, control device 12 and configuration device 14 may all communicate using the same wireless technology and form a single network. In other examples one or more of the tyre monitoring devices 10, control device 12 and configuration device 14 may be separated from other elements of the system. Such separation may be provided in software, for example by providing a suitable firewall and/or the use of different network IDs and encryption keys. Such separation may also be provided by hardware, for example by different wireless communication technology. Both hardware and software separation may be combined. For example, in the system of FIG. 1, the control device communicates with the tyre sensing devices with a different wireless communication technology than the configuration, which may improve the security of the system.

Figure 2:
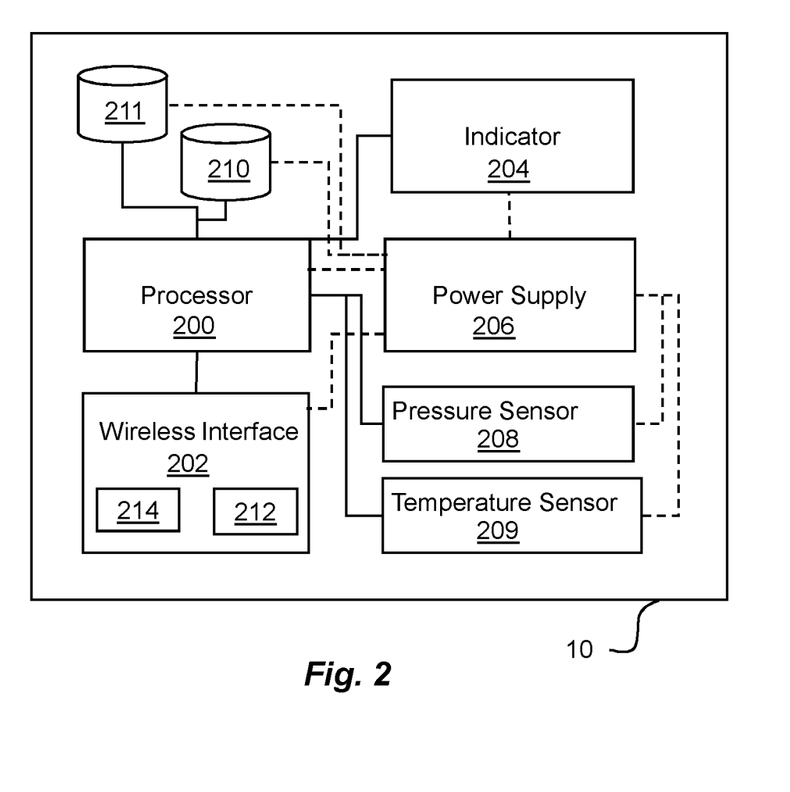
FIG. 2 shows a schematic representation of a tyre monitoring device for use in the example of FIG. 1.

FIG. 2 shows a schematic representation of a tyre monitoring device 10 for use in the tyre pressure sensor system of FIG. 1. The tyre monitoring device 10 is configured for mounting on a wheel, for example by a mechanical connection to an opening on the wheel providing access to the tyre. The tyre monitoring device 10 includes a processor 200, a wireless communication interface 202, an indicator 204, a power supply 206, and a pressure sensor 208, at temperature sensor 209, a first storage 210 and a second storage 211.

Processor 200 may be any suitable processing device including a microprocessor with one or more processing cores. In use, processor 200 coordinates and controls the other components and may be operative to read and/or write computer program instructions and data from/to the storage 210, 211. The processor may be optimized for low power operation or have at least one processing core optimized for low power operation in some examples.

Wireless communication interface 202 is connected to the processor 200 and is used to both transmit and received data from the other devices of the tyre pressure sensor system. In this example, the wireless communication interface includes two transceivers, 212, 214 which both use different wireless technology. A first transceiver 212 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 212, the second transceiver 214 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 204 is connected to the processor 200 and controlled by the processor 200 to provide indications to a user of the tyre pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first colour and a second colour of emitted light. Further indications can also be provided, such as solid or flashing light. The tyre monitoring device has a housing (not shown) and the indicator 204 can provide an indication outside the housing, for example the LED may be mounted external to the housing or visible through the housing, or sound may be able to be emitted from within the housing.

The power supply 206 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the wireless sensing device may spend much of its operational life in "sleep" or low power mode, with most of the components other than the processor and wireless communication interface powered off. This can conserve battery life. For example, the tyre monitoring device may be by default in a low power mode, listening for a command to measure or report tyre pressure. As tyre pressure readings are likely to be required relatively rarely, perhaps as little as once every 10 days, once every 5 days, once every 3 days or once per day, this can provide useful power savings. In other examples, pressure may be sensed more frequently for example every 10 minutes, 15 minutes, 20 minutes, 30 minutes, 1 hour or 2 hours and stored for use in trend monitoring.

The pressure sensor 208 is connected to processor 200 and may be any suitable sensor for measuring pressure, for example a capacitive sensor. Similarly, the temperature sensor 209 is connected to processor 200 and may be any suitable sensor for measuring temperature, such as thermocouple. The temperature sensor 209 may be arranged to measure the temperature of the wheel or the temperature of the gas inside the tyre directly. Where the temperature sensor 209 measures the temperature of the wheel, this can be processed to determine the temperature of the gas in the tyre. For example, an algorithm or look-up table may be used.

The connection of the pressure sensor 208 and temperature sensor 209 to the processor 200 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value. Although this example includes a pressure sensor and a temperature sensor, other examples may include only a pressure sensor, or may include further sensors.

This example includes two storage elements 210 and 211. Storage 210 is non-volatile rewritable storage in this example, such as flash memory which can retain data without requiring applied power. Other examples may include volatile storage, which is kept powered by the power supply, or combinations of read-only and rewritable storage. Storage 210 is connected to the processor 200 and used to store both computer program instructions for execution by the processor and data, such as data from the pressure sensor 208 or received over the wireless communication interface 202. In some examples, storage 210 may store a history of pressure and/or temperature readings sensed by the pressure sensor 208 and the temperature sensor 209. For example, the previous ten days readings may be stored, with the newest data replacing the oldest once the storage is full.

Storage 211 is secure storage to which write and/or read access is restricted, for example only accessible to certain processes running on processor 200. Configuration data, such as wireless encryption keys can be stored in storage 211. In other examples, a single storage may be provided, or storage 210 and 211 may be provided in a single physical device with a logical partitioning between storage 210 and storage 211.

Figure 3:
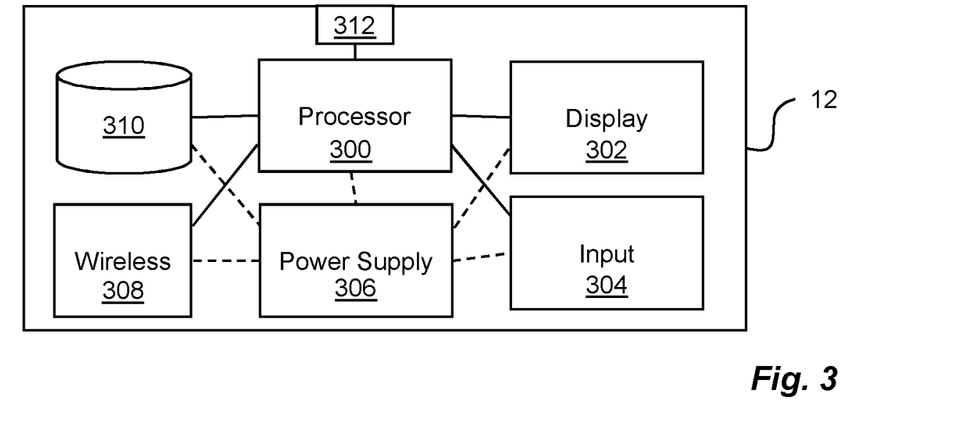
FIG. 3 shows a schematic representation of a control device for use in the example of FIG. 1.

FIG. 3 shows a schematic representation of a control device 12 for use in the example of FIG. 1. The control device 12 includes a processor 300, a display 302, an input system 304, a power supply 306, a wireless interface 308, a storage 310 and wired communication interface 312. In this example the control device is a mobile device, such as a cellular phone or a tablet computer.

The processor 300 is any suitable processing device, for example a multipurpose microprocessor, system-on-chip, or system in package, which may include one or more processing cores. Processor 300 is connected to the display 302, such an LCD, OLED or e-ink display to display information to a user of the control device.

Input system 304 includes a touch screen interface in this example, allowing a user to interact with the control device by touching user interface elements on the screen. The input system 304 may include one or more buttons in addition to the touch screen, as well as other input devices, such as a microphone for speech recognition and a camera for image input. Other examples may not include a touch screen interface.

The control device is powered by power supply 306, which is a rechargeable lithium-ion battery in this example. Other examples may use alternative power supplies, such as other battery technologies, mains power, or energy harvesting, such as solar power.

A wireless interface 308 is included for the control device 12 to communicate with other devices in the tyre pressure sensor system. In this example, a single wireless interface 308 is provided which is configured to communicate with the tyre monitoring devices 10. For example, a relatively long range wireless communication technology can be used, such as one conforming to IEEE 802.15.1, IEEE 802.15.4 or IEEE 802.11. This allows the control device 12 to interact with the tyre monitoring devices from a relatively long range.

In other examples, the control device may be provided with multiple wireless communication interfaces or transceivers, operating with different wireless technologies, such as at least two of IEEE 802.15.1, IEEE 802.15.4, IEEE 802.11 (Wi-Fi_33), WAIC, RFID and NFC. For example, the control device may have two transceivers with one having a longer communication range than the other.

Storage 310 includes a non-volatile element, such as flash memory, and a volatile element, such as RAM. The non-volatile element is used to store operating system software and application software. In this example, the control device runs standard operating system software and is loaded with application software to interact with the tyre pressure sensor system. In order to restrict access to the tyre pressure sensor network, the application software may be provided from a secure source and not available to the general public, and/or require credentials to be entered before operating.

Wired communication interface 312 is provided for connection to a computing system. The wired communication interface 312 can be for example, a serial data connection, such as Universal Serial Bus (USB), a parallel data connection or a network connection, such as Ethernet. The wired communication interface 312 may allow the control device to communicate values and/or other status information read from the tyre monitoring devices to the computing system, for example to store long term trends and assist fleet management. Alternatively, or additionally, wireless communication interface 308 may be used for communication with the computing system. In some examples, the control device may not include a wired communication interface.

Figure 4:
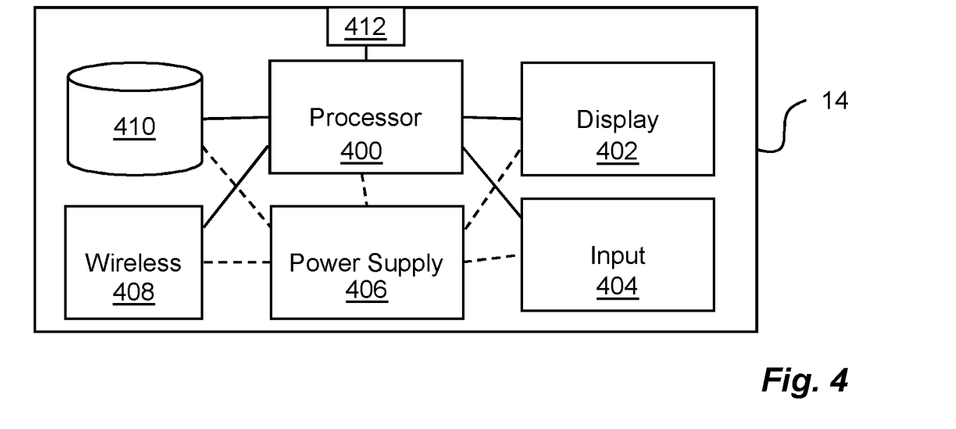
FIG. 4 shows a schematic representation of a configuration device for use in the example of FIG. 1.

FIG. 4 shows a schematic representation of a configuration device 14 for use in the example of FIG. 1. The configuration device 14 includes generally the same elements as the control device 12: a processor 400, display 402, input system 404, power supply 406, wireless interface 408, storage 410 and wired communication interface 412 and these are generally the same as described above for the control device, unless described otherwise below. In this example the configuration device is a mobile device but is restricted to operate only with the tyre monitoring system. For example, the configuration device may be a computing device or tablet which can only run software for interaction with the tyre monitoring system.

The wireless communication interface 408 of the configuration device in this example is a relatively short-range communication system, for example IEEE 802.15.1, IEEE 802.15.4, NFC or RFID. This allows the configuration device to act as an additional authentication factor when configuring the tyre monitoring devices, for example the tyre monitoring device may only respond to configuration commands received from the configuration device or may only respond to configuration commands received from the control device after a command received from the configuration device.

In other examples, the configuration device may include multiple wireless communication interfaces or transceivers. For example, the configuration device may include a transceiver for relatively short range communications as discussed above and a transceiver for relatively long-range communications, such as one conforming to IEEE 802.11.

The wired communication interface 412 of the configuration device may be used to provide information to the configuration device in a secure manner, for example enabling some encryption keys to be updated over a wired interface, such as a serial data connection, rather than a wireless interface.

In some examples, the configuration device 14 may be omitted and its place taken by the control device 12. The control device 12 may comprise a short range wireless communication interface, such as one conforming to IEEE, 802.15.1, IEEE 802.15.4, RFID or NFC. Application software may be loaded onto the control device to allow the control device to also function as an additional authentication factor, perhaps through the maintenance of cryptographic keys which can only be accessed with suitable credentials to control the operation of the short range wireless communication interface for the transmission of configuration commands. In these examples, separate application software may be provided on the control device which can be executed to cause the control device to function as a configuration device.

Figure 5:
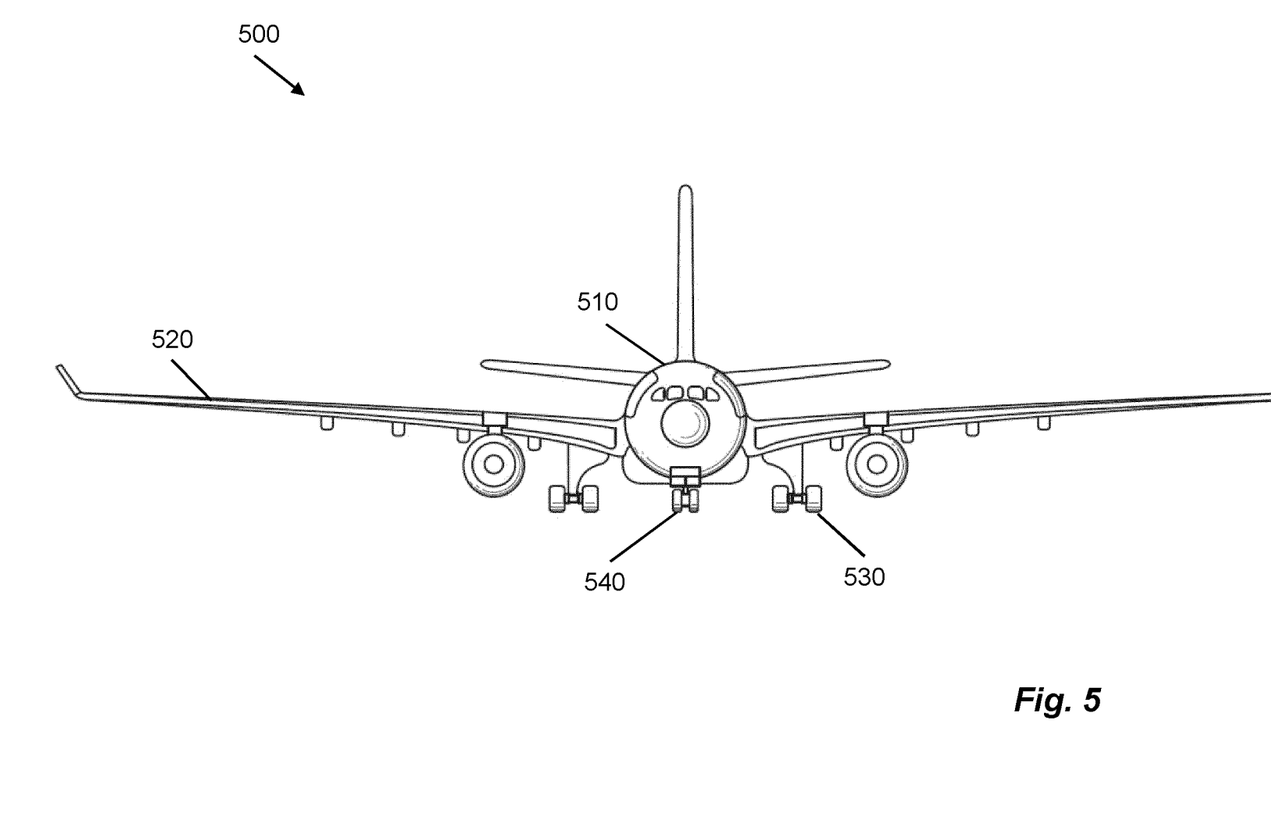
FIG. 5 shows a schematic representation of a tyre pressure sensor network installed in an aircraft.

FIG. 5 shows a schematic representation of a tyre pressure sensor network installed in an aircraft. The aircraft 500 comprises a fuselage 510, wings 520, main landing gear 530 and nose landing gear 540. According to an example, the aircraft 500 comprises a sensor network according to any of the examples described herein. The aircraft 500 may be used in conjunction with any of the methods described herein. According to an example, a plurality of wireless nodes are distributed at various locations around the aircraft 500. For example, in the landing gear 530, 540, the wings 520, and in the fuselage 510. Tyre monitoring devices are installed on each wheel of the main landing gear 530 and nose landing gear 540.

In an example, the tyre monitoring devices 10 are also in communication with a cockpit system to provide tyre pressure information to the pilots on the flight deck. In these examples, the flight deck console may also function as a control device.

Example Tyre Pressure Check Processes

Figure 6:
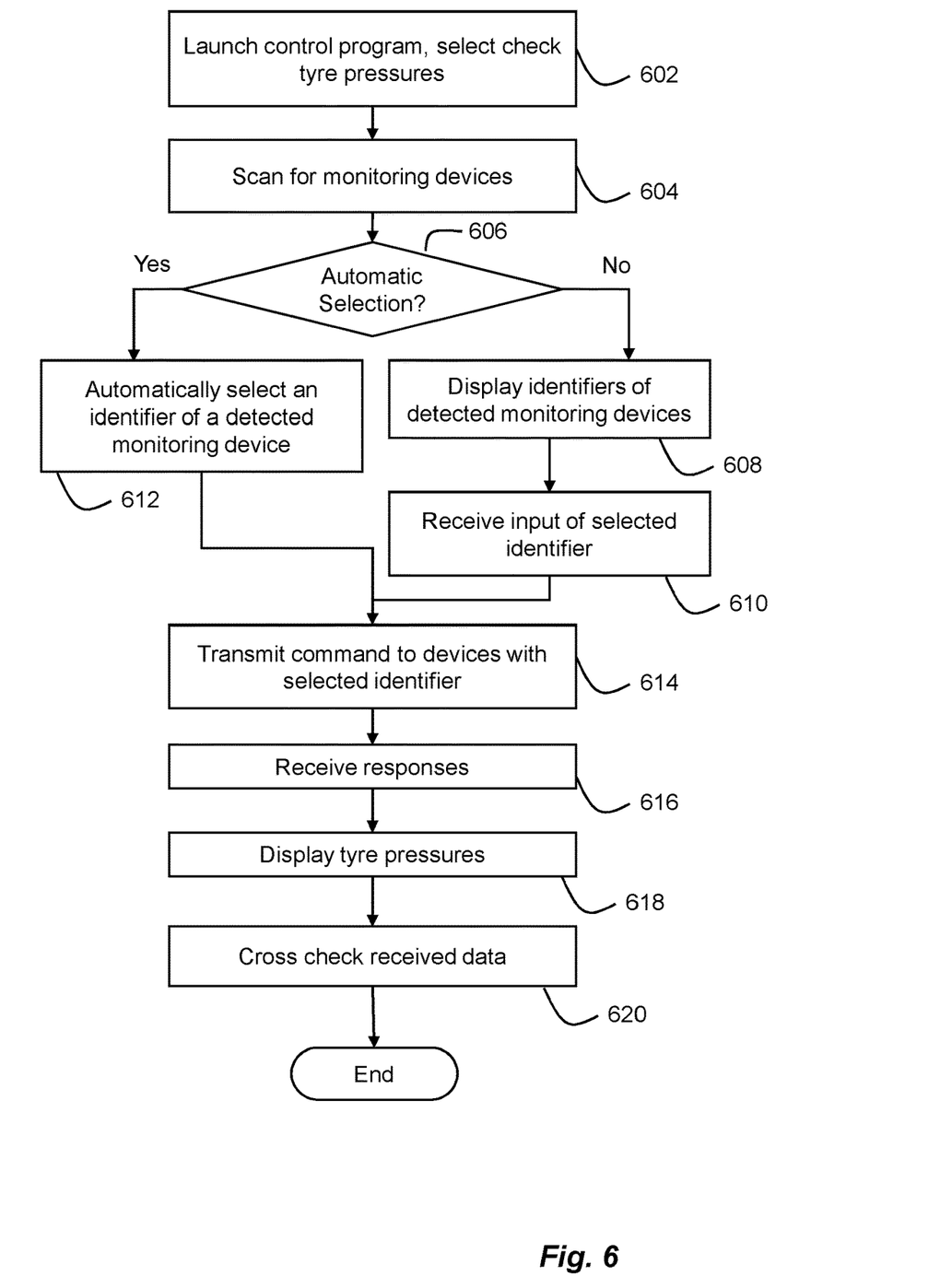
FIG. 6 shows a flow chart of a tyre pressure check process that can be used with the example of FIG. 1.

FIG. 6 shows a flow chart of a tyre pressure check process that can be used with the example of FIG. 1. First, at block 602, a user launches the tyre monitoring control application on the control device 12. During initialization of the application, a check is made that the wireless communication interface 308 for communication with the monitoring devices is active on the control device and the user is prompted to activate if it is not active.

Next, at block 604, the control device scans for tyre monitoring devices in range. For example, the control device may send out a probe over the wireless communication interface which causes any tyre monitoring devices in range to respond with an indication of their vehicle identifier, such as tail identifier of an aircraft to which the tyre monitoring device is attached. The scanning may comprise establishing direct, point-to-point contact with each tyre monitoring device, or contact through the network of tyre monitoring devices, for example through an access point, a master device, or any device in a mesh network. The scanning may comprise waking the tyre monitoring devices from a low power mode. The scanning may comprise using a secure network key to communicate with the sensor network.

Depending on the communication range and location, tyre monitoring devices associated with more than one vehicle may be detected. For example, several aircraft may be in the same hanger in range of the control device. Next, at block 606, it is determined whether an identifier should be selected automatically, without requiring using input. For example, the application may store a configuration option whether an identifier should be selected automatically or not. If automatic selection is not required, the process continues to block 608. If automatic selection is required, the process continues to block 612. In some examples, block 606 is not included. In these examples, the process can continue with either manual selection or automatic selection as explained below.

For manual selection, at block 608, the control device displays the identifiers of detected vehicles. At block 610, input is received of a selected identifier, for example from a user selection of the desired identifier.

For automatic selection, at block 612 a vehicle identifier is automatically selected from amongst the identifiers indicated in the received responses. The can be done in various ways. For example, when each tyre monitoring device in range responds individually to the control device, at least two responses may be from tyre monitoring devices associated with the same vehicle identifier. In that case, the vehicle identifier associated with the largest number of responses may selected automatically because that is likely to be the vehicle closest to the control device for which pressure measurement is required. In another example, the vehicle identifier of the tyre monitoring device closest to the control device may be selected, for example a response having a greatest Received Signal Strength Indication (RSSI). In a further example, all detected tyre monitoring devices may be associated with the same vehicle identifier, in which case that is selected.

Next, at block 614, a command is sent to the tyre monitoring devices corresponding to the selected identifier to cause them to read the pressures and report back to the control device, for example they may execute a process as described below with reference to FIG. 7.

Responses are received from the tyre monitoring devices at block 616 and displayed on the control device at block 618. The display of pressures may include one or both of a numerical value and a status indication such as "OK" or "Low Pressure".

At block 620 a cross check of the received data may be made to ensure data consistency. The process then ends.

Throughout the process of FIG. 6, communication between the control device and the sensor devices may be secure, for example encrypted by a network key. The network key for the communication with the control device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. This alone may be sufficient to provide increased security because physical proximity is required to intercept communications. In some examples, security may be increased by reducing transmission power when encryption keys are transmitted compared to transmission of the encrypted data itself, requiring closer proximity for the initial key exchange process.

Figure 7:
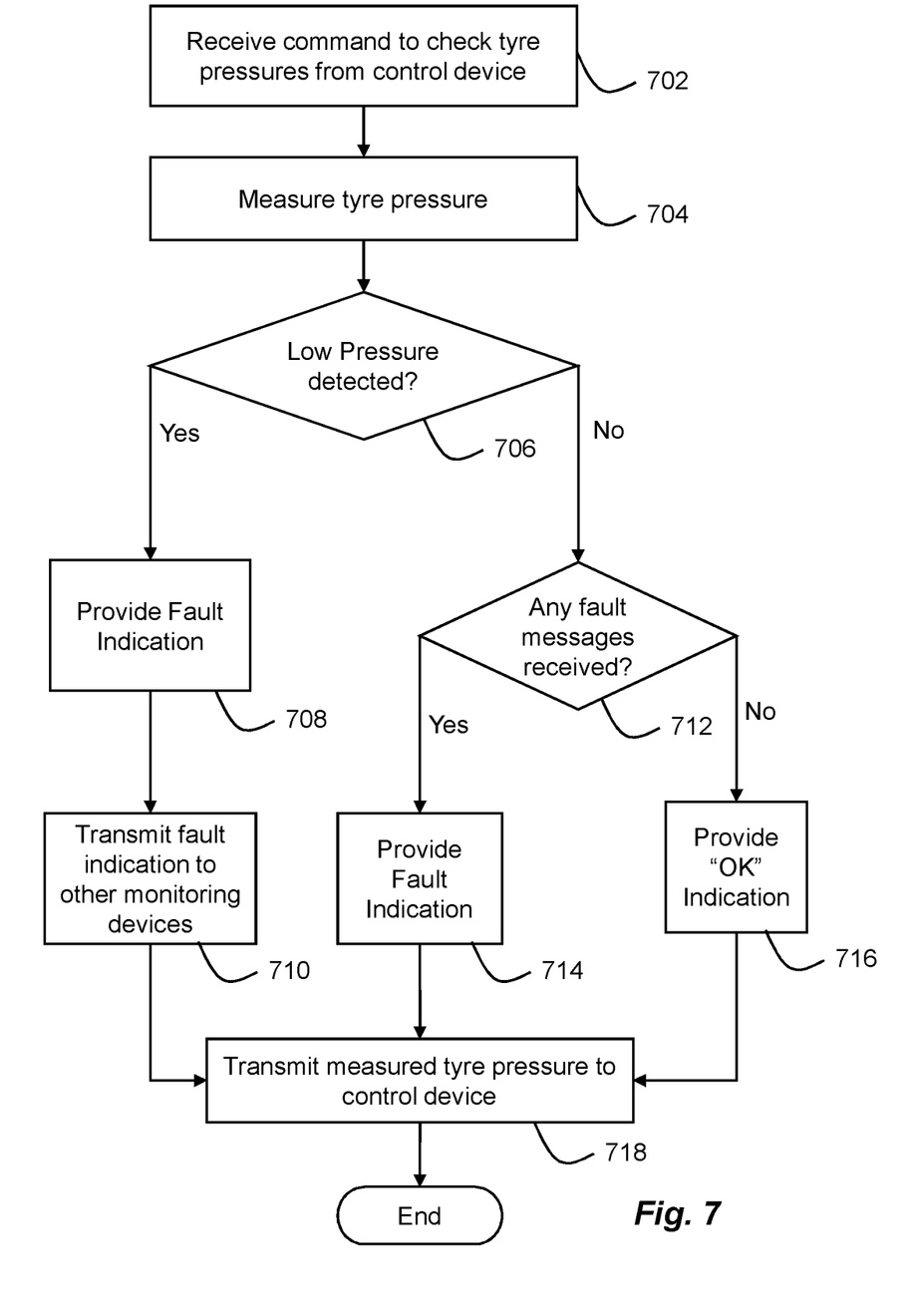
FIG. 7 shows a flow chart of tyre pressure check process that can be used by the tyre monitoring device of FIG. 2.

FIG. 7 shows a flow chart of tyre pressure check process that can be used by the tyre monitoring device of FIG. 2. This process is provided to provide additional assurance and fault tolerance in the pressure measurements from the system, for example to guard against corrupt operation or errors in the control device. Through this process, the monitoring device uses its indicator to provide an indication of tyre pressure status independent of the control device. In some examples, the indication of tyre pressure status by the monitoring device may have a higher Development Assurance Level (DAL) than the indication provided on the control device. For example, although the control device may be used to initiate a tyre pressure measurement and provide a convenient means for a user to understand the results of the measurement it may not have DAL certification, while the operation of the monitoring device to provide the indication using the indicator on the monitoring device may be certified to Development Assurance Level B. This may allow the system to operate with a wide range of control devices, because certification of those devices to a DAL is not required, but still ensure that the system as a whole meets required safety standards. Similarly, in some examples the monitoring device may have a higher Security Assurance Level (SAL) than the control device.

First, at block 702, a tyre monitoring device receives a command to check pressures over the wireless communication interface from the control device. In response, at block 704, the processor uses the pressure sensor to measure the pressure in the tyre. The measured pressure is then compared against the reference pressure in block 706 to determine whether the tyre has low pressure. In this example low pressure occurs if the pressure sensed by the pressure sensor is less than 89% of the reference pressure. Other examples may determine a low pressure when the measured pressure is less than 95%, less than 90% or less than 85% of the reference pressure. Further examples may determine a low pressure when the measured pressure is at least about 207 kPa (about 30 psi) less than the reference pressure. Other examples may determine a low pressure when the measured pressure is at least about 138 kPa (about 20 psi), or about 69 kPa (about 10 psi) less than the reference pressure. If low pressure is detected, execution proceeds to block 708, otherwise execution proceeds to block 712.

At block 708, the processor uses the indicator to indicate a fault condition, for example by providing a solid red light for a predetermined period. The predetermined period may be 5 minutes, 2 minutes, 1 minute, or 30 seconds, for example. The processor also broadcasts a fault indication to the other tyre monitoring devices at block 712, again using the wireless communication interface.

At block 712, the processor checks to see whether any fault messages from other tyre monitoring devices have been received via the wireless communication interface. Such fault messages may be received directly, via other tyre monitoring devices or through a hub or access point. In this example, such fault messages are received without first being requested, following the receipt of the command in block 704. In other examples, the fault message may be received responsive to a status enquiry sent by the tyre monitoring device to the other tyre monitoring devices. If any fault messages are received, execution proceeds to block 714, where the processor uses the indicator to display a fault condition. For example, the fault indication may be the same as that used in block 708. In other examples, the fault indication may be different than that used in block 708, for example a second fault indication such as a flashing red light for a predetermined period. By using the second fault indication, the tyre monitoring device can indicate a fault in another tyre yet signal that its own measured pressure is not low.

If no fault messages are received at block 712, execution proceeds to block 716 where the processor uses the indicator to provide an "OK" indication. For example, by providing a solid green light for a predetermined period. The predetermined period may be 5 minutes, 2 minutes, 1 minute, or 30 seconds, for example. In this way, the "OK" indication is only given when all tyre monitoring devices have determined that the pressure of their associated tyre is not low and that they have not received an indication of a fault from another of the tyre monitoring devices.

Finally, at block 718, the data of the measured tyre pressure is transmitted to the control device in response to the command. This data may include further information such as stored reference pressure, determined status, and wheel position. Transmission of additional information may allow verification of the correct operation of the tyre monitoring device and a check that the configuration data stored in the storage has not changed or has been set up correctly. The transmission in block 718 may be sent directly to a control device 12, to another tyre monitoring device 10 for onward routing, or to an access point or other wireless node.

With the method of FIG. 7, confirmation of tyre pressure status is provided by the tyre monitoring devices themselves. A fault in any sensor causes all sensors to indicate a fault. In this way, the tyre monitoring devices may be certified according to a required DAL and/or SAL using the indication on the tyre monitoring devices themselves without requiring the control device to also be certified.

In other examples, rather than transmitting a fault indication at block 710, all tyre monitoring devices may instead transmit their measured pressure to other tyre monitoring devices. Received pressures may then be independently checked by each independent tyre monitoring device to determine whether faults exist. This may guard against a fault in a sensor which does not indicate a low pressure condition, for example if the stored reference pressure has become corrupted.

In further examples, the tyre monitoring device may transmit an "OK" status notification when it is determined that the tyre pressure is not low in block 706. Such examples may provide assurance that all sensors are operating correctly, because if no data is received from one of the other tyre monitoring devices it is indicative of a malfunction or fault in that tyre monitoring device.

Although the processes above describe the use of a general mobile device as a control device, the control device may also be a dedicated device provided only for use with the tyre monitoring system, or with the vehicle more generally. This may improve security as greater control is available.

Although the processes above describe the use of an indicator which is a light, other examples may use other indicators, such as displays and/or audio components. For example, rather than simply display a solid or flashing colour, a display may also display information of the measured pressure itself. Where audio and visual indicators are both provided, some indications may not use both the audio and visual indicator. For example, an "OK" indication may use only the visual indicator, with the audio indicator only activated on a fault.

Operation of a Tyre Monitoring System when there is an Error

Figure 8:
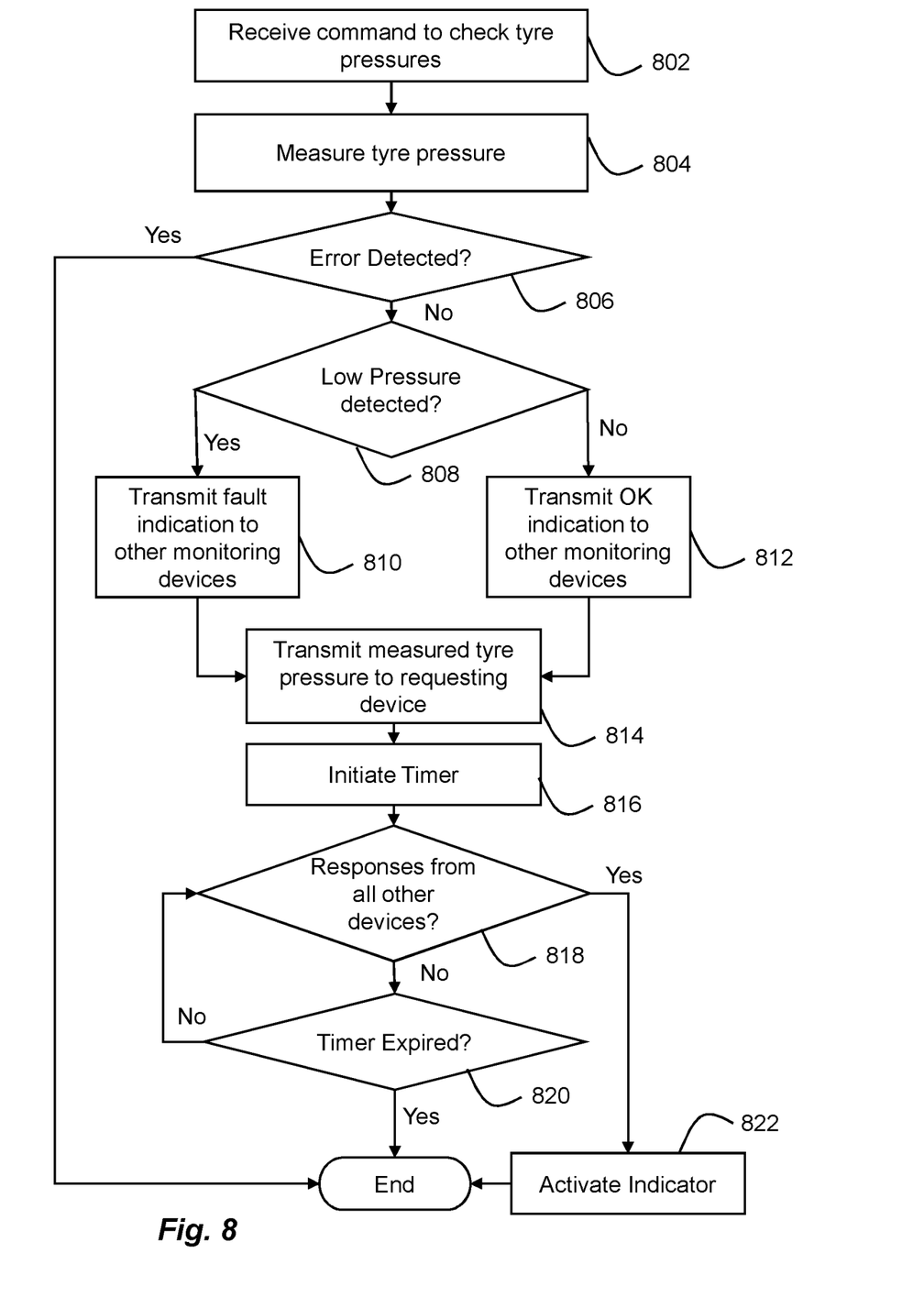
FIG. 8 shows a flow chart of a measurement process including detecting an error which can be used by the tyre monitoring device of FIG. 2.

A tyre monitoring system provides important safety benefits by ensuring that the tyres are operating within acceptable limits. In some cases, the tyre monitoring system may be used to replace manual tyre measurements, such as tyre pressure measurements. In that case, it can be useful for the system to be able to identify errors and indicate these in a clear way. It is also useful that in the presence of an error the system fails safe, so that the likelihood of erroneous results being relied on is reduced. FIG. 8 depicts a method for a tyre monitoring device, such as the tyre monitoring device of FIG. 2 above, which can provide an indication of an error and provide fail safe operation of the system.

First, at block 802, the tyre monitoring device receives a command or instruction to check tyre pressures from the control device over the wireless communication interface. This is received from a control device, such as the control device of FIG. 3 above. In other examples the command may be received from a configuration device, such as the configuration device of FIG. 4 above. The tyre monitoring device then proceeds to measure the pressure of the tyre associated with the tyre monitoring device at block 804 using the pressure sensor. The result of the measurement is stored and the method continues to block 806.

At block 806, the tyre monitoring device checks for errors. This may be carried out in any suitable manner, for example error checks may be carried out on the internal storage and/or on the operation of the hardware of the device. Should any of these error checks indicate that the tyre monitoring device has a defective component or an error, such as a corrupt memory or a hardware fault, the error status is noted. For example, a flag or other variable may be set or initiated which indicates that there is an error. In some examples, a variable may be assigned a value corresponding to the source of the error, such as an error with the pressure sensor, a storage error, a configuration error, and so on. Note that an error is not the same as a fault in the context of this specification. As discussed above with reference to FIG. 7, a fault means that there is a fault in the tyre associated with the tyre monitoring device which requires remedial action. Thus, a fault can occur while the tyre monitoring device is operational without errors, whereas an error means that there is some malfunction with the tyre monitoring device itself which causes its results to be questionable. If it is determined that there is an error, execution ends. If it is determined that there is no error, execution proceeds to block 808.

Because execution ends when an error is detected, the method of FIG. 8 means that no response is sent to other devices in the system, such as the control device or other tyre monitoring devices. In this way, the absence of a response can indicate an error. In addition, because the process ends at this point, the indicator on the tyre monitoring device itself is not activated in the presence of an error.

At block 808, the pressure measurement is reviewed against the reference pressure to determine whether it is acceptable. For example, the same process may be carried out as in block 706 described above with reference to FIG. 7. If the pressure is determined to be low, execution proceeds to block 810. Otherwise, if the pressure is determined not to be low, i.e. the pressure is acceptable, execution proceeds to block 812.

At block 810, the tyre monitoring device transmits a fault indication to others of the tyre monitoring devices. At block 812, the tyre monitoring device transmits an "OK" indication to other tyre monitoring devices. Thus, the status of the tyre monitored by the monitoring device is transmitted to the other tyre monitoring devices in the system.

From blocks 810 and 812, execution proceeds to block 814. At block 814 the measured tyre pressure is transmitted to the requesting device (the control device in this example, the configuration devices in other examples) using the wireless communication interface. For example, the numerical value of the tyre pressure may be transmitted, along with details of reference pressure in some examples. Alternatively, the same "fault" or "OK" indication may be transmitted also to the control device.

Next, at block 816, a timer is initiated. The timer allows a set period for responses from other tyre monitoring devices in the system to be received. For example, the timer may be set for 30 seconds, 1 minute, 2 minutes, 3 minutes, 4 minutes or 5 minutes.

After the timer has been initiated, the tyre monitoring device checks whether it has received responses from all the other tyre monitoring devices associated with the same vehicle at block 818. For example, the tyre monitoring device may store the position identifiers of other wheels associated with the same vehicle and check whether responses are received for all of those position identifiers. In another example, the tyre monitoring device may know how many other tyre monitoring devices are in the system, such as 5 in the case of a six-wheeled aircraft, and check whether the same number of responses have been received as there are other devices in the system. If responses from all the other tyre monitoring devices in the system have been received, execution proceeds to block 822. Otherwise, execution proceeds to block 820.

In block 820 it is checked whether the timer has expired or reached a threshold level of time. For example the timer may be set for 30 seconds, 1 minute, 2 minutes, 3 minutes, 4 minutes, or 5 minutes as discussed above. If the timer has expired, then the process ends. As with detection of an error in block 806, this means that if the timer expires without receiving responses from all the other tire monitoring devices in the system, no indication is provided by the device. Thus, if there is an error in any of the other tyre monitoring devices, no indication will be provided by the tyre monitoring device. All the tyre monitoring devices in the system will therefore provide no indication in the event that any other device has an error because in that case no transmission is made by the device experiencing an error. The system fails safe because if any device is totally inoperable it will also provide no indication.

At block 822, the indicator is activated depending on the status of the tyre monitoring device itself and on the responses received from other tyre monitoring devices. For example, the indicator may be activated to provide an OK indication only if the pressure of the tyre monitoring device itself is OK or acceptable and all of the received responses indicate that the pressure of other devices is OK or acceptable. Activating the indicator can be carried out in the same way as described above with respect to blocks 706, 708, 712, 714 and 716 of FIG. 7.

The method of FIG. 8 therefore provides a method of operating a tyre monitoring device in which an error status can be shown by not activating an indicator. Because the indicator is not activated, the error status can be distinguished from a fault status. In contrast to an error, which indicates a hardware failure or other malfunction of the time monitoring device, a fault status indicates a fault in the tyre associated with the tyre monitoring device which requires remedial action. Thus, the error and fault status cannot be easily confused. In addition, because no indication is provided by any of the tyre monitoring devices in the system in the event of a fault in any one of them, the system will fail safe and an operator cannot misinterpret an indication of an error as a fault.

In the method of this example, the transmission of data representing the status of the tyre monitoring device, such as the fault indication of block 810 and the OK indication of block 812, is sent only when it is determined that there is no error. Thus, receiving no response from a particular tyre monitoring device is representative of an error in the tyre monitoring device. In some examples, the transmission in blocks 810 and 812 may instead be replaced by a transmission of the actual measured data, such as a measured pressure and/or temperature, possibly also with information of a reference pressure.

The activating of the indicator requires both a determination that there is no error and that responses have been received from all other tyre monitoring devices in the system. Thus, the activation of the indicator only occurs when no error is determined in the tyre monitoring device itself and in the other tyre monitoring devices in the system.

The transmission of status information, such as measured tyre pressure, in block 814 only happens if no error is detected. If the control device receives no response to a measurement command, this can be interpreted as indicative of an error in any tyre monitoring device which does not provide a response.

Figure 9:
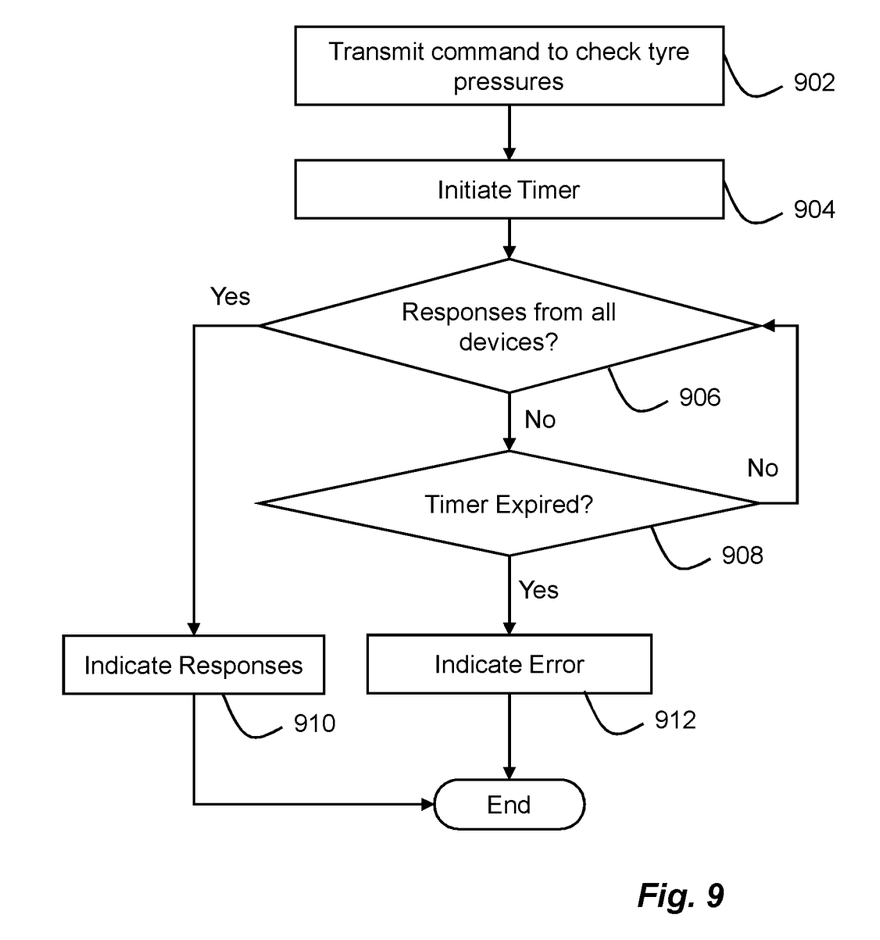
FIG. 9 shows a flow chart of a measurement process that can indicate an errors in one or more tyre monitoring devices which can be used by the control device of FIG. 3.

Referring now to FIG. 9, a method for a control device to cause tyre monitoring devices to check tyre pressures in which any errors that may be present in the tyre monitoring devices can be detected by the control device is shown.

The method begins at block 902 where the control device transmits a command using its wireless communication interface to check tyre pressures to all the tyre monitoring devices associated with a particular vehicle, such as an aircraft. Next, at block 904, a timer is initiated or reset to monitor a set period of time in which the tyre monitoring devices may provide a response with a result of the tyre pressure measurement. The timer may be set for any suitable period of time, for example 30 seconds, 1 minute, 2 minutes, 3 minutes, 4 minutes or 5 minutes. Meanwhile, in response to the command transmitted at block 902, the tyre monitoring devices each carry out a measurement process as described above with respect to FIG. 8. In due course, all those tyre monitoring devices which are operating without error transmit a response to the control device using their respective wireless communication interfaces.

At block 906, the control device evaluates whether it has received responses to the command from all the tyre measurement devices associated with the vehicle. If responses from all the devices have been received, execution proceeds to block 910. If all responses have not yet been received, so that at least one device has not provided a response, execution proceeds to block 908.

At block 908 the status of the timer is investigated. If the timer has expired, execution proceeds to block 912, otherwise execution returns to block 906 to determine whether responses from all the tyre monitoring devices have now been received.

In block 910, the control device provides an indication of the responses received from the tyre monitoring device, such as on its display. Depending on the content of the responses this indication may simply be an OK or fault status, or may contain more information. For example, an indication may be provided on the display showing the actual numerical value of measured pressure against each wheel, possibly on a diagrammatic representation of the vehicle. The status of each individual wheel may further be indicated, such as colouring any wheels which require remedial or maintenance action, such as reinflation, in red and colouring wheels which require no action in green.

In block 912, the control device instead provides an indication that there is an error. The indication may include details of which tyre monitoring devices have an error. Tyre monitoring devices having an error can be deduced as those from which no response was received. For example, the control device may receive identification data of the tyre monitoring devices in the received responses. This enables the control device to determine those tyre monitoring devices from which a response has been received and those tyre monitoring devices from which no response has been received. For example, the responses may indicate a wheel position and vehicle identifier, which together provide an identifier for a tyre monitoring device. In other examples, the responses may include an identifier of a particular tyre monitoring device which can be cross referenced with data already stored in the control device of a wheel position of that device.

In this way a control device can provide information when one or tyre monitoring devices experience an error. This information may guide fault finding by further indicating which of the devices have an error, this is not possible to determine from the tyre monitoring devices themselves because in the event of an error in any one tyre monitoring device, none of the tyre monitoring devices provide an indication.

It is to be noted that the term "or" as used herein is to be interpreted to mean "and/or", unless expressly stated otherwise.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of operating a tire monitoring device associated with a vehicle, the tire monitoring device comprising an indicator and a wireless communication interface, the method comprising:
    receiving an instruction to measure a tire pressure via the wireless communication interface;
    measuring a tire pressure;
    determining an error status of the tire monitoring device; and
    responsive to a determination that the error status is not indicative of an error, activating the indicator to provide an indication based on the tire pressure.

2. The method of claim 1, further comprising responsive to a determination that the error status is indicative of an error, not activating the indicator.

3. The method of claim 1, further comprising, responsive to the determination that the error status is not indicative of an error, transmitting data representative of a device status to other tire monitoring devices associated with the vehicle.

4. The method of claim 1, further comprising:
    receiving data representing tire pressure measurements from other tire monitoring devices associated with the vehicle;
    and wherein the activating the indicator is in dependence on both a determination that the error status does not indicate an error and a determination that data representative of device status has been received from all the other tire monitoring devices associated with the vehicle.

5. The method of claim 4, wherein the indication provided by the indicator is based on both the measured tire pressure and the data representative of device status received from other tire monitoring devices associated with the vehicle.

6. The method of claim 1, further comprising, responsive to the determination that the error status is not indicative of an error, transmitting data representative of a device status to a control device.

7. The method of claim 1, further comprising, responsive to the activating the indicator, transmitting data representative of a device status to a control device.

8. A tire monitoring device comprising:
    a wireless communication interface;
    an indicator;
    a pressure sensor; and
    a processor configured to execute the method according to claim 1.

9. A system comprising:
    a control device comprising a wireless communication interface; and
    a plurality of tire monitoring devices configured to be affixed to a wheel, the tire monitoring devices comprising a wireless communication interface and an indicator;
    wherein, the plurality of tire monitoring devices are configured to receive a measurement command from the control device via the wireless communication interface and to indicate that they have an error by:
    not activating the indicator; and
    not transmitting a response to the measurement command.

10. A system comprising a plurality of tire monitoring devices according to claim 8.

* * * * *